UNITED STATES PATENT OFFICE.

JULIUS BUEB, OF DESSAU, GERMANY, ASSIGNOR TO THE ROESSLER & HASSLACHER CHEMICAL COMPANY, OF NEW YORK, N. Y.

PROCESS OF MAKING HYDROCYANIC ACID.

SPECIFICATION forming part of Letters Patent No. 642,782, dated February 6, 1900.

Application filed October 1, 1898. Serial No. 692,391. (No specimens.)

*To all whom it may concern:*

Be it known that I, JULIUS BUEB, a subject of the Emperor of Germany, and a resident of Dessau, Germany, have invented certain new and useful Improvements in Recovering Hydrocyanic Acid from Gases Containing Cyanogen, of which the following is a specification.

This invention relates to the production of hydrocyanic acid from gases (other than coal-gas) containing cyanogen—such, for example, as the gases obtained by the dry distillation of molasses or residues resulting from sugar-making. The invention is also applicable to the separation of synthetically-formed hydrocyanic acid from other gases combined therewith. In dealing with such gases various difficulties have hitherto been encountered in separating from them the hydrocyanic acid as such, more particularly in effecting its separation from carbonic acid, and hitherto it has been necessary in order to extract hydrocyanic acid from the gases in question to adopt the same course as that which has to be followed in obtaining cyanogen from coal-gas, the cyanogen being first separated in the form of a double ferro-cyanogen salt and then converted into the required alkaline compound of cyanogen. The present invention enables this indirect process to be replaced by a process permitting the said gases to be freed from their hydrocyanic acid direct, such acid being then, when required, converted into the alkaline compound by another direct operation.

In carrying out this invention the gases to be treated are cooled, and if they contain ammonia they are conducted through diluted sulphuric acid—say at twenty per cent.—which will absorb the ammonia. The sulphate-of-ammonia lye thus obtained, which by the gradual addition of concentrated sulphuric acid may be made to contain as much as from twenty-eight to thirty per cent. of $(NH_4)_2SO_4$, is then evaporated to convert it into solid sulphate of ammonia. The gases freed from ammonia are conducted through a tower or vessel in contact with a current of high-grade alcohol passing in the opposite direction. The alcohol exercises its selective action upon the hydrocyanogen contained in the gases and separates such acid from the gases and dissolves it, so that an alcoholic solution of hydrocyanic acid is discharged from the bottom of the tower. The solution of hydrocyanic acid thus obtained is subjected to fractional distillation and the hydrocyanic-acid vapors are condensed. This is preferably accomplished by conducting the alcohol and hydrocyanic-acid vapor which has been distilled off through chambers containing alcoholic caustic alkali. When the hydrocyanic acid and caustic alkali meet, the cyanogen alkali, scarcely soluble in alcohol, becomes precipitated in the form of a white powder. The alcohol which distils through and is free from hydrocyanic acid is condensed and can be again utilized in the tower for the purpose of absorbing hydrocyanic acid. The chambers containing the alcoholic caustic alkaline lye are disconnected after the lye has been used up and discharged upon a strainer, having been allowed to cool first, if necessary. After straining a certain amount of cyanogen alkali remains upon the strainer, and this on being dried will be found to contain from ninety-six to ninety-eight per cent. of pure cyanogen salt. The alkali lye running off from the strainer, containing from two to four per cent. of cyanogen alkali, is placed in a saturator in front of the alcohol-tower, and the gases containing cyanogen from which hydrocyanic acid is to be separated passing through it precipitate the alkali in the form of an alkaline carbonate, while the alcohol becomes saturated with hydrocyanic acid. The carbonate of alkali precipitated after having been strained and dried will contain ninety-nine per cent. of carbonate. The alcohol containing hydrocyanic acid is treated in the manner hereinbefore described.

The hereinbefore-described process may be used in all cases to which from its nature it is applicable and where the object is to separate hydrocyanic acid as such from gas or gas mixtures containing cyanogen.

I claim—

1. The process for separating hydrocyanic acid directly from gases resulting from the destructive distillation of organic matters, which consists in subjecting such gases to contact with a current of alcohol passing in the opposite direction, substantially as described.

2. The process for separating hydrocyanic acid directly from gases resulting from the destructive distillation of organic matters, which consists in subjecting such gases to contact with a current of alcohol passing in the opposite direction, and subjecting the alcoholic solution of hydrocyanic acid thus formed to fractional distillation, substantially as described.

3. The process for separating hydrocyanic acid from gases resulting from the destructive distillation of organic matters, which consists in subjecting such gases to contact with alcohol, subjecting the alcoholic solution of hydrocyanic acid thus formed to fractional distillation, and reacting upon the hydrocyanic-acid gas with alcoholic caustic alkali, substantially as described.

4. The process of separating hydrocyanic acid from gases resulting from the destructive distillation of organic matters, which consists in subjecting such gases to contact with alcohol, subjecting the alcoholic solution of hydrocyanic acid thus formed to fractional distillation, separating the hydrocyanic-acid gas from the alcohol by reaction with alcoholic caustic alkali, straining off the alkali lye containing cyanogen alkali salt from the precipitate, reacting upon this mother-lye with the distillation-gases, and subjecting the hydrocyanic acid thus liberated, with the distillation-gases, to contact with alcohol, substantially as described.

In testimony whereof I have signed my name to this specification in the presence of two subscribing witnesses.

JULIUS BUEB.

Witnesses:
FRANZ HASSLACHER,
MICHAEL VOLK.